US007269543B2

(12) United States Patent
Salmonsen et al.

(10) Patent No.: US 7,269,543 B2
(45) Date of Patent: Sep. 11, 2007

(54) SYSTEM AND METHOD FOR PROVIDING NETWORK CONNECTIVITY TO A COMMON EMBEDDED INTERFACE BY STIMULATING THE EMBEDDED INTERFACE

(75) Inventors: Daniel R. Salmonsen, Saratoga, CA (US); William S. Herz, Hayward, CA (US)

(73) Assignee: Zoran Corporation, Sunnyvale, CA (US)

( * ) Notice: Subject to any disclaimer, the term of this patent is extended or adjusted under 35 U.S.C. 154(b) by 724 days.

(21) Appl. No.: 10/084,403

(22) Filed: Feb. 25, 2002

(65) Prior Publication Data
US 2003/0163484 A1     Aug. 28, 2003

(51) Int. Cl.
G06F 9/455    (2006.01)
(52) U.S. Cl. .......................................... 703/23; 700/94
(58) Field of Classification Search ................ 703/23; 700/94
See application file for complete search history.

(56) References Cited

U.S. PATENT DOCUMENTS

| | | | |
|---|---|---|---|
| 5,974,547 A | 10/1999 | Klimenko | 713/2 |
| 6,119,153 A * | 9/2000 | Dujari et al. | 709/218 |
| 6,185,617 B1 | 2/2001 | Housel, III et al. | 709/227 |
| 6,192,471 B1 | 2/2001 | Pearce et al. | 713/2 |
| 6,233,389 B1 | 5/2001 | Barton et al. | 386/46 |
| 6,298,446 B1 | 10/2001 | Schreiber et al. | 726/27 |
| 6,304,965 B1 | 10/2001 | Rickey | 713/2 |
| 6,327,652 B1 | 12/2001 | England et al. | 713/2 |
| 6,330,670 B1 | 12/2001 | England et al. | 713/2 |
| 6,345,279 B1 | 2/2002 | Li et al. | 707/104.1 |
| 6,353,173 B1 | 3/2002 | D'Amato et al. | 84/609 |
| 6,353,892 B2 | 3/2002 | Schreiber et al. | 726/26 |
| 6,372,974 B1 | 4/2002 | Gross et al. | 84/609 |

(Continued)

FOREIGN PATENT DOCUMENTS

EP    0911728    4/1999

(Continued)

OTHER PUBLICATIONS

Tannebaum, Andrew; "Computer Networks", 1996, Third Edition, Prentice-Hall.*

(Continued)

Primary Examiner—Paul Rodriguez
Assistant Examiner—Russ Guill
(74) Attorney, Agent, or Firm—Goodwin Procter LLP

(57) ABSTRACT

The invention relates to an audio/visual system for providing network connectivity to a common embedded interface by simulating the embedded interface. The audio/visual system is coupled to a computer that has at least one memory, and comprises a rendering circuit having a memory and an emulation circuit that is coupled to the rendering circuit. The emulation circuit comprises a memory for storing instruction sequences and a processor coupled to the memory, that executes the stored instruction sequences. The audio/visual system further comprises an audio/visual apparatus coupled to the rendering circuit and the emulation circuit, and a display coupled to the rendering circuit. The stored instruction sequences cause the processor to (a) retrieve information stored in one of the memory of the audio/visual apparatus or the memory of the computer; (b) forward the information to the rendering circuit for processing; (c) forward the processed information to the display; and (d) display the processed information. Various embodiments are described.

31 Claims, 7 Drawing Sheets

U.S. PATENT DOCUMENTS

| | | | |
|---|---|---|---|
| 6,407,680 | B1 | 6/2002 | Lai et al. .................... 341/50 |
| 6,446,073 | B1 | 9/2002 | D'Amato et al. ........... 707/101 |
| 6,449,367 | B2 | 9/2002 | Van Wie et al. ............ 380/232 |
| 6,557,041 | B2 | 4/2003 | Mallart ....................... 709/231 |
| 6,636,929 | B1 | 10/2003 | Hascall et al. .............. 710/313 |
| 7,043,479 | B2* | 5/2006 | Ireton .......................... 707/10 |
| 2001/0007568 | A1 | 7/2001 | Morris ........................ 370/473 |
| 2002/0054134 | A1 | 5/2002 | Kelts .......................... 715/788 |
| 2002/0082730 | A1* | 6/2002 | Capps et al. ................. 700/94 |
| 2002/0101997 | A1 | 8/2002 | Curtis et al. |
| 2002/0129096 | A1 | 9/2002 | Mansour et al. ............ 709/203 |
| 2003/0110236 | A1* | 6/2003 | Yang et al. ................. 709/219 |
| 2003/0135859 | A1* | 7/2003 | Putterman et al. ............ 725/78 |
| 2005/0113946 | A9* | 5/2005 | Janik ............................ 700/94 |

FOREIGN PATENT DOCUMENTS

| | | |
|---|---|---|
| WO | WO95/24705 | 9/1995 |
| WO | WO 01/67758 | 9/2001 |
| WO | 03/073229 | 9/2003 |
| WO | 2006/019503 | 2/2006 |

OTHER PUBLICATIONS

Anon, digital 5 News, Zorand and Digital 5 Partner to Demonstrate Vaddis DVD Multimedia Processor and Netmedia in Wireless Home-Networked DVD Platform, Jan. 9, 2002, www.digital5.com/press_010902a.html, USA.

Tom Hite; Jean Moonen; John Ritchie, The Audio/Video Unified Specification Approach, UpnP Newsletter, Second Quarter, 2002, www.upnp.org/newsletters/newsletterVI/tech.asp, Microsoft Corporation, USA.

ATI, "All-in-one Wonder Radeon Users' Setup and Installation Guide", 2002, ATI Technologies Inc., pp. 1-55.

MSI, "694D PRO", Micro-Star Int'l Co., Oct. 20, 2000, pp. 1-3, http://web.archive.org./web/20001020133334/www.msicomputer.com/products/details.asp?ProductID=141.

Anon. John G. Spooner, IBM: Give hard drives the boot?, ZDNet UK News, 2002, http://news/zdnet.co.uk/cgi-bin/uk/printer_friendly.cgi?id=2111185, CNET Networks, Inc., UK.

Anon., ETHERBOOT, About EtherBoot, 2002, http://etherbootsourceforge.net/, EtherBoot.org., USA.

Anon, IBOOT, iBoot-Remote Boot over iSCSI, 2002, www.haifa.il.bm.com/projects/storage/iboot/faq.html., IBM, Israrel.

International Search Report for PCT/US03/05776 dated May 22, 2003.

International Search Report for PCT/US03/05777 dated Sep. 9, 2003.

International Search Report for PCT/US2003/05778 dated Sep. 29, 2005.

Invitation to Pay Additional Fees for PCT/US05/022045 dated Oct. 7, 2005.

International Search Report for PCT/US2005/022045 dated Sep. 23, 2005.

Written Opinion for International Search Report for PCT/US2005/022045 dated Sep. 23, 2005.

* cited by examiner

SYSTEM AND METHOD FOR PROVIDING NETWORK CONNECTIVITY TO A COMMON EMBEDDED INTERFACE BY STIMULATING THE EMBEDDED INTERFACE

BACKGROUND OF THE INVENTION

1. Field of the Invention

The present invention relates in general to network connectivity, and more particularly to a system and method for providing network connectivity to a common embedded interface so as to leverage the system's downstream signal processing and handling circuitry. The invention also relates to efficiently retrieving, updating, organizing, delivering and presenting information through a communication network.

2. Description of the Related Art

In the consumer electronics industry, there are many single-function, yet highly complex appliances or devices. Examples of such devices include televisions, digital video cassette recorders, digital versatile disk players and audio receivers. As technology evolves, the computational power and capability of the devices increase, providing better consumer experience with each successive generation of products. However, these devices tend to be unique in architecture and dedicated in function. They are typically not designed to interact with each other or with other devices.

In addition, advances in technology have led to the availability of a vast amount of information accessible via a computer network such as the world wide web (www) or the internet. The world wide web enables a user to have easy access to information on a world wide scale. In addition, it facilitates delivery of information world wide. Such information includes text files, video clips, web pages, flash and/or shareware presentations, computer programs and other information that can be provided in digital format. However, the delivery of such information to a home networking system is currently limited because of the lack of interoperability and resource management between devices.

Accordingly, there is a need in the industry for a system and method for overcoming the aforementioned problems.

BRIEF SUMMARY

The invention relates to an audio/visual system for providing network connectivity to a common embedded interface by simulating the embedded interface. The audio/visual system is coupled to a computer that has at least one memory, and comprises a rendering circuit having a memory and an emulation circuit that is coupled to the rendering circuit. The emulation circuit comprises a memory for storing instruction sequences and a processor coupled to the memory, that executes the stored instruction sequences. The audio/visual system further comprises an audio/visual apparatus coupled to the rendering circuit and the emulation circuit, and a display coupled to the rendering circuit. The stored instruction sequences cause the processor to (a) retrieve information stored in one of the memory of the audio/visual apparatus or the memory of the computer; (b) forward the information to the rendering circuit for processing; (c) forward the processed information to the display; and (d) display the processed information. Various embodiments are described.

DETAILED DESCRIPTION OF THE EMBODIMENTS

Figure 1:
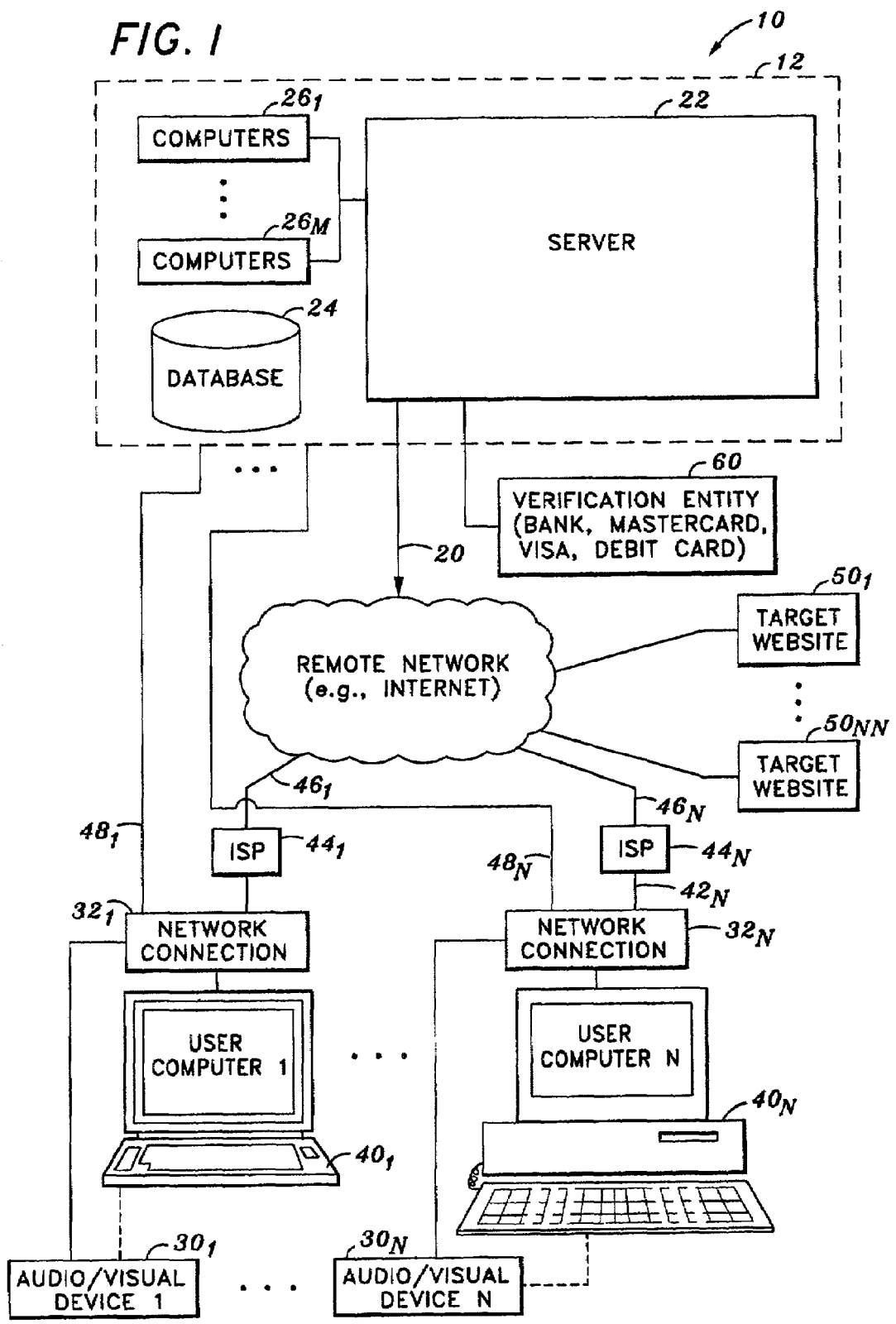
FIG. 1 is a system block diagram of one embodiment of a network system in which the apparatus and method of the invention may be implemented.

One aspect of the invention relates to a system and method for providing network connectivity. In one embodiment, the invention relates to a system and method for providing network connectivity to a common embedded interface so as to leverage the system's downstream signal processing and handling circuitry without requiring the addition of specialized appliances. In one embodiment, the common embedded interface is implemented as an audio/visual device. Examples of the audio/visual device include (but are not limited to) a digital versatile disc (DVD) player, a compact disc (CD) player or a television.

Another aspect of the invention involves the emulation of the protocol, format and/or control system of a target. Such emulation may be implemented through hardware, firmware or software located in the audio/visual device. For example, where the audio/visual device is a DVD system, an emulation circuit within the DVD system retrieves, manages and processes content that has been selected by the user through the use of a graphical user interface. In this manner, the emulation circuit behaves as though it is the DVD drive, and provides content that may be located locally or remotely, to the viewer.

The invention also relates to efficiently retrieving, organizing and delivering information through a communication network. In one embodiment, the information provided is appliance-compliant. In alternate embodiments, the information may be processed either by a computer or by the appliance prior to being displayed. In one embodiment, the information comprises media elements. The media elements may include text, a file of video clips, static photographs, JPEG images, audio clips, animation, graphics, any type of informational material or any combination thereof.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. Content and/or media elements refers to application programs, driver programs, utility programs, file, payload, and combinations thereof, as well as graphics, informational material (articles, stock quotes, etc.) and the like, either singly or in any combination. A "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

System Overview

A description of an exemplary system, which incorporates embodiments of the invention, is herein described. FIG. 1 shows a system block diagram of one embodiment of a network system 10 in which the apparatus and method of the invention is used. Referring to FIG. 1, the network system 10 comprises a service center 12 that is connected over one or more communication links 20 to a remote network 30 (e.g., a wide area network or the Internet) or a remote site (e.g., a satellite, which is not shown in FIG. 1) to one or more audio/visual devices $30_1$-$30_N$ ("30"). The service center 12 may also be connected over one or more communication links 20 to the remote network 30 or remote site to one or more user computer systems $40_1$-$40_N$ ("40"). In one embodiment the service center 12 is a website. The service center 12 includes one or more servers 22 and one or more databases 24. In one embodiment, the server 22 includes software modules that may be downloaded for performing the processes of the invention, as described in detail in the following sections.

The server 22 may be coupled to one or more verification entities such as entity 60 for verification of credit information and for processing credit transactions. The service center 12 may also include one or more computers $26_1$-$26_M$. If a plurality of computers are used, then the computers $26_1$-$26_M$ may be connected by a local area network (LAN) or any other similar connection technology. However, it is also possible for the service center 12 to have other configurations. For example, a smaller number of larger computers (i.e. a few mainframe, mini, etc. computers) with a number of internal programs or processes running on the larger computers capable of establishing communication links to the user computers.

The remote network 30 or remote site allows the service center 12 to provide peer-to-peer information and services to the audio/visual apparatuses or devices $30_1$-$30_N$ (generally referred to as device 30) and/or user computers $40_1$-$40_N$, using software that is stored at the service center 12. In one embodiment, the audio/visual devices 30 may be a DVD player, a CD player, a digital video cassette recorder (VCR), a television or an audio receiver. In other embodiments, the audio/visual device may be any device that processes and/or presents audio and/or video information. The one or more databases 24 connected to the service center computer(s), e.g., computer $26_1$, are used to store data. Each audio/visual device $30_1$-$30_N$ is connected via network connection $32_1$-$32_N$ over a corresponding communication link $42_1$-$42_N$ such as a local carrier exchange to a respective ISP $44_1$-$44_N$, through which access to the remote network 30 is made.

Likewise, each user computer $40_1$-$40_N$ is connected via network connection $32_1$-$32_N$ over a corresponding communication link $42_1$-$42_N$ such as a local carrier exchange to a respective ISP $44_1$-$44_N$, through which access to the remote network 30 is made. By inputting the URL address of the target website with which the user desires to interact, the user may be connected to various target websites, such as websites $50_1$-$50_{NN}$. In an alternate embodiment, each audio/visual device connection $30_1$-$30_N$ and/or user computer $40_1$-$40_N$ may be connected via network connection $32_1$-$32_N$ over a corresponding communication link $48_1$-$48_N$ to the service center 12, which provides internet access and service to the user computer(s) 40. In a further embodiment, the display screen for viewing the content or media elements may be located on a television coupled to the network 30. In this case, navigation through the content or media elements may be provided through the use of control buttons on a remote control unit for controlling viewing of the television, or by other means known in the art.

One aspect of the present invention relates to retrieval and delivery of content and/or media elements. The software for providing such processes may be developed and/or stored on a computer 40, or may be developed using one of the computers $26_1$-$26_M$. Upon completion of the development process, the software may be stored in the computer 40 or in the database 24. Alternatively, the software may be stored on a machine-readable medium, in any of the computers 40 or audio/visual devices 30.

Information that is provided to the audio/visual device 30 may be provided in real time or in non real time. In one embodiment, where information or content is not stored on the computer 40 or available on the audio/visual device 30, real time streaming may be provided, by retrieving the information from the server 22 or any of the web sites 50. Non real time streaming may also be provided, where information or content is stored or cached at the computer 40 or A/V device 30.

Figure 2:
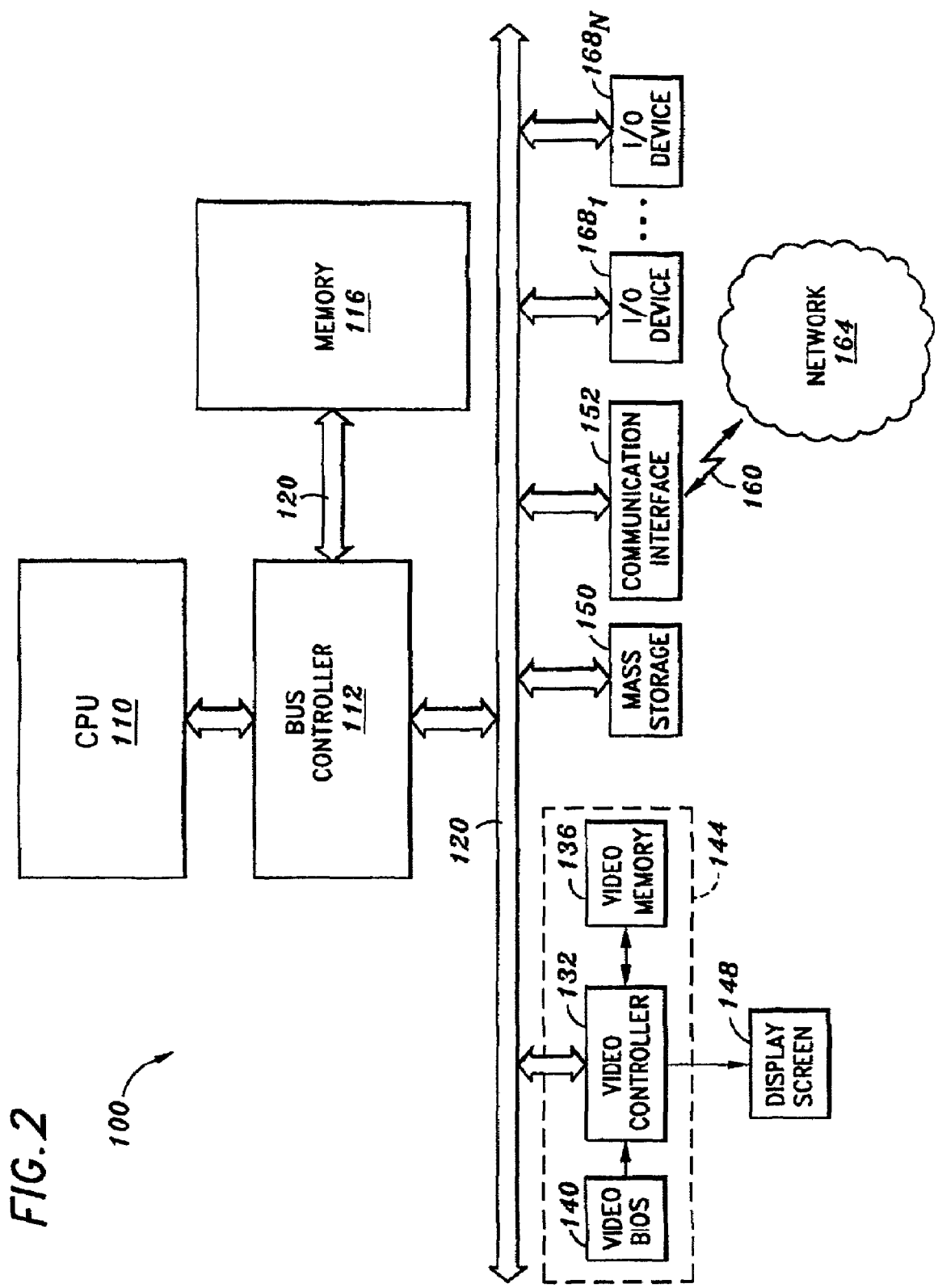
FIG. 2 is a system block diagram of one embodiment of a computer system which implements the embodiments of the invention.

Referring to FIG. 2, the computer system 100 (representing either of computer 26 or 40) comprises a processor or a central processing unit (CPU) 110. The illustrated CPU 110 includes an Arithmetic Logic Unit (ALU) for performing computations, a collection of registers for temporary storage of data and instructions, and a control unit for controlling operation for the system 100. In one embodiment, the CPU 110 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 110. The CPU 110 is not limited to microprocessor but may take on other forms such as microcontrollers, digital signal processors, reduced instruction set computers (RISC), application specific integrated circuits, and the like. Although shown with one CPU 110, computer system 100 may alternatively include multiple processing units.

The CPU 110 is coupled to a bus controller 112. The bus controller 112 may include a memory controller (not shown) integrated therein, though the memory controller may be external to the bus controller 112. The memory controller provides an interface for access by the CPU 110 or other devices to memory 116 via memory bus 114. In one embodiment, the system memory 116 includes synchronous dynamic random access memory (SDRAM). System memory 116 may optionally include any additional or alternative high speed memory device or memory circuitry. The bus controller 112 is coupled to a system bus 120 that may be a peripheral component interconnect (PCI) bus, Industry Standard Architecture (ISA) bus, etc. Coupled to the system bus 120 are a graphics controller, a graphics engine or a video controller 132, a mass storage device 150, a communication interface device 152, and one or more input/output (I/O) devices $168_1$-$168_N$. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 110 through an Advanced Graphics Port (AGP) bus.

The mass storage device 150 includes (but is not limited to) a hard disc, floppy disc, rewriteable CDRW-ROM, rewriteable DVDRW-ROM, tape, high density floppy, high capacity removable media, low capacity removable media, solid state memory device, etc., and combinations thereof. The mass storage device 150 may include any other mass storage medium. The communication interface device 156 includes a network card, a modem interface, etc. for accessing network 164 via communications link 160. The I/O devices $168_1$-$168_N$ include a keyboard, mouse, audio/sound card, printer, and the like. The I/O devices $168_1$-$168_n$ may be disk drive, such as a compact disc (CD) drive, a hard disc drive, a tape drive, a zip drive, a jazz drive, a digital versatile disc (DVD) drive, a magneto-optical disk drive, a high density floppy drive, a high capacity removable media drive, a low capacity media device, and/or any combination thereof.

As discussed earlier, the information, content and/or application software may be stored in the database 24, on the computers 40, on an audio/visual device 30 or on a machine-readable medium. The information, content and/or application software may also be made available to users such as those located at audio/visual devices $30_1$-$30_N$ and/or user computer 1–N, i.e., computers $40_1$-$40_N$, through service center 12 or by means of the machine-readable medium.

As discussed earlier, one aspect of the invention relates to a system and method for retrieving, updating, organizing and presenting information located either locally in a computer, a local audio/visual device or on a remote site through a communication network, and to provide a seamless display of the information. In one embodiment, a request may be made by a user or viewer for content or media elements. The system and process of the invention may retrieve the desired content/media element from either the local computer or from a local audio/visual device. If unavailable on either the local computer or local audio/visual device, the system and process of the invention will retrieve the requested content/media element from a remote site. The retrieved content/media element is then processed (e.g., decompressed, formatted, etc.). Users may then view the processed content/media element on a display device.

Figure 3A:
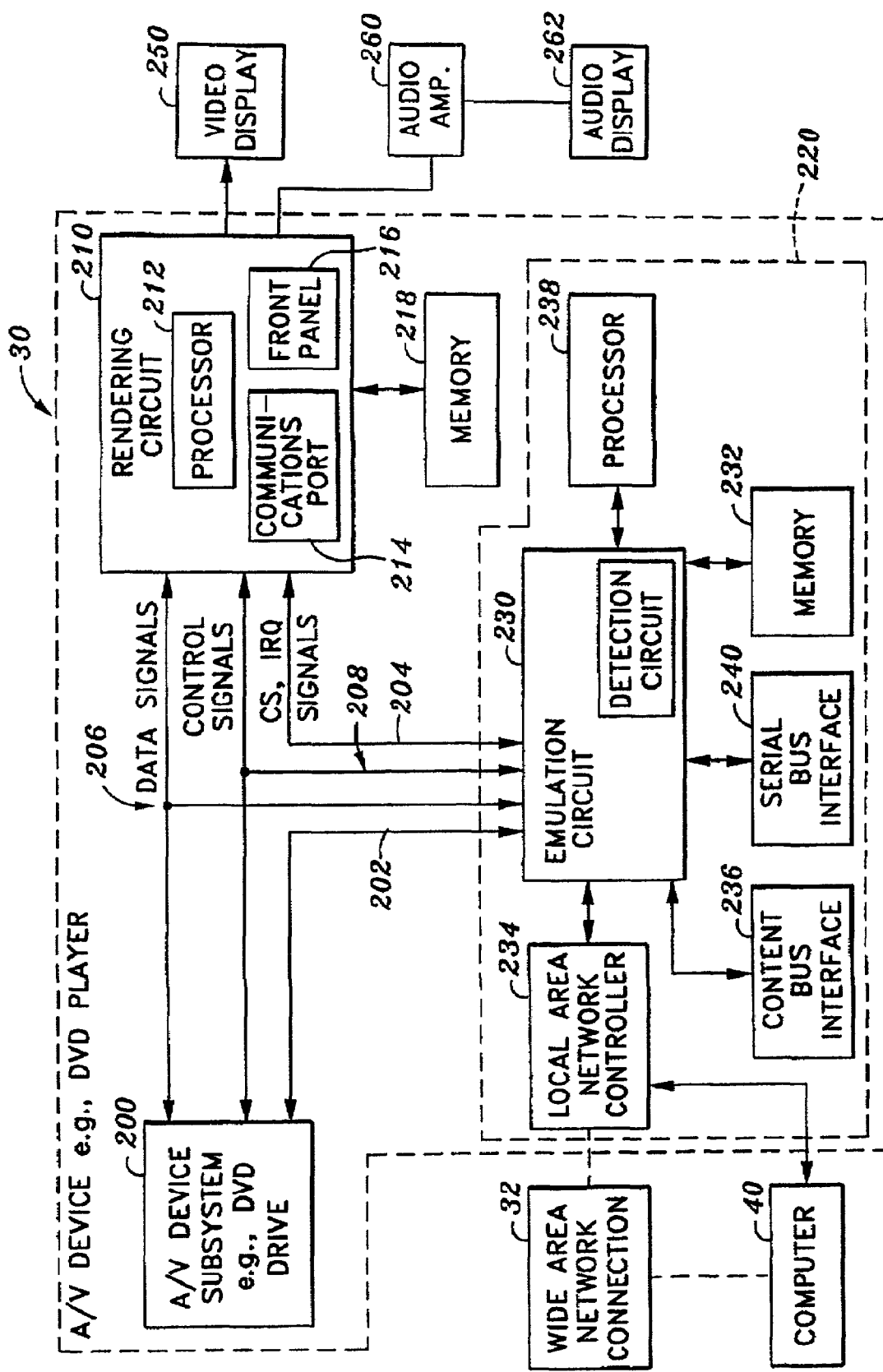
FIG. 3A is a detailed system block diagram of one embodiment of the audio/visual device 30.

FIG. 3A illustrates one embodiment of a detailed system diagram of the AV device 30. In one embodiment, the AV device is a DVD player. As shown, the audio/visual device 30 comprises an audio/visual (AV) device subsystem 200 (such as a DVD drive), a rendering circuit 210, and an emulation circuit 230. In one embodiment, the rendering circuit 210 is coupled to memory 218. In a further embodiment, the rendering circuit 210 includes a processor 212, a serial communications port 214 and a front panel 216. In one embodiment, the processor 212 may be a central processing unit or a micro controller. The serial communications port 214 may receive control signals from another device, such as a remote control. The front panel 216 may include various input/output controls, such as an alpha-numeric pad, volume control buttons or other function selection keys.

In one embodiment, the emulation circuit 230 may be a field programmable gate array, an integrated circuit or any circuit that can be programmed. The emulation circuit 230 may also be coupled to memory 232 (such as SDRAM), a content bus interface 236, a processor 238 and a serial bus interface 240. In one embodiment, the processor 238 may be a central processing unit or a micro controller. The emulation circuit 230 is connected to the AN device subsystem 200 via communication bus 202. The emulation circuit 230 is also connected to the rendering circuit 210 via communication bus 204. The A/V device subsystem 200 and rendering circuit 210 are connected via communication bus 202. In addition, the A/V device subsystem 200, rendering circuit 210 and emulation circuit 230 are also connected via communication busses 206 and 208. In one embodiment, the buses 202, 204, 206 and 208 may be parallel busses. In a further embodiment, the buses 202, 204, 206 and 208 may each be an Integrated Drive Electronics (IDE) bus, an audio/visual bus, an advanced technology attachment packet interface (ATAPI) bus, a SCSI bus or any combination thereof. In one embodiment, the content bus interface 236 may enable connection to a LAN card, a Universal Serial Bus, an IEEE 1394 compatible bus, an Audio Visual bus, a SCSI, a cable modem, a digital camera, a video camcorder, a personal digital assistant (PDA) or any other electronic device. The serial bus interface 240 may provide interface to a mouse, keyboard or other input devices. Media elements from any of these devices or from devices coupled to these buses, may be retrieved and delivered to the rendering circuit 210 to be processed, and thereafter, to be displayed.

In one embodiment, data signals may flow between the A/V device subsystem 200 and the A/V device rendering circuit 210. Data signals may also flow between the A/V device subsystem 200 and the emulation circuit 230, or between the A/V device rendering circuit 210 and the emulation circuit 230 via communication bus 206. Control signals may also flow between the A/V device subsystem 200 and the emulation circuit 230, or between the rendering circuit 210 and the emulation circuit 230 via communication bus 208. Control signals CS and interrupt request (IRQ) signals may flow bi-directionally between the A/V device subsystem 200 and emulation circuit 230 or between the rendering circuit 210 and the emulation circuit 230.

In one embodiment, the rendering circuit 210 communicates bi-directionally with memory 218. Likewise, the emulation circuit 230 communicates bi-directionally with memory 232. The emulation circuit 230 may include a detection circuit for detecting the presence of a communications port, such as an infra red (IR) or radio frequency (RF) port. The detection circuit may be implemented in hardware, firmware or software. This capability enables the emulation circuit 230 to detect if a communications port is present. If so, it may proceed to determine if commands or control signals are being issued from a remote device to the A/V device 30 via the communications port.

The emulation circuit 230 is also coupled to a local network controller 234. The local network controller 234 enables the A/V device to interface with local area networks. The emulation circuit 230 may also be coupled to a wide area network (such as the Internet) via wide area network connection 32. The wide network controller 32 also facilitates operation of the A/V device 30 with any computer network standard, with broadband devices and modems. In one embodiment, the computer may be connected to the A/V device via the local network controller 234. In an alternate embodiment, the computer 40 may be connected to the A/V device 30 via wide area network connection 32. The A/V device subsystem 200 may be coupled to a network (via said wide area network connection 32) comprising a plurality of A/V device subsystems, and other media elements or information may be retrieved from one of the plurality of A/V device subsystems.

Figure 3B:
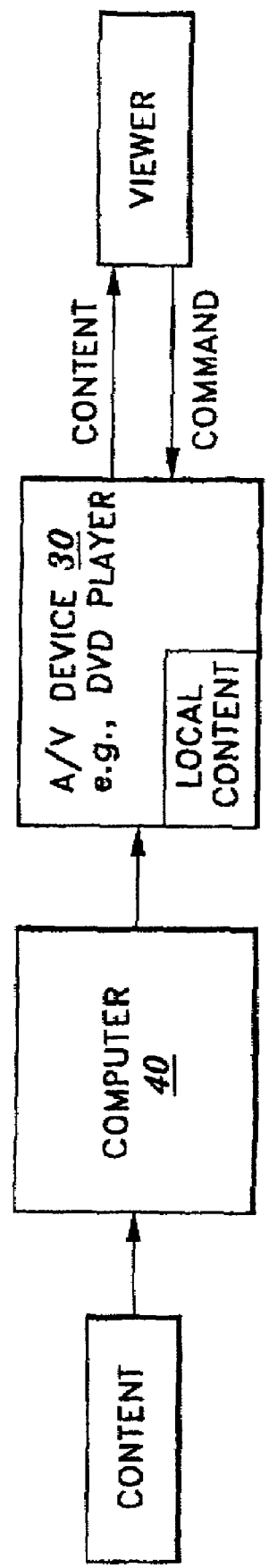
FIG. 3B is a functional block diagram of one embodiment of the system illustrated in FIG. 3A.

FIG. 3B is one embodiment of a functional diagram of the system illustrated in FIG. 3A. Content may be stored on the A/V device subsystem 200 (such as a DVD drive), in the computer 40 or on a remote network site 12 or 50 (see FIG. 1). In one embodiment, content located on either of the A/V device subsystem 200, the computer 40 or on a remote site 12 or 50 is retrieved by the processor 212 of the rendering circuit 210, under the control of the emulation circuit 230. The retrieved content is either processed by the computer 40 or the rendering circuit 210. In one embodiment, where the received content is in a format that is native to the A/V device 30 (or in a format that the rendering circuit is configured to process), for example, where the A/V device 30 is a DVD player, and the content is in any of: an MPEG 2 DVD format, MPEG VCD format, MPEG 2 Super VCD format or any DVD compliant format, the content will be provided directly to the rendering circuit 210, which decompresses the content, prior to forwarding the content for display. If the content is in a format that is not native to the A/V device 30 (i.e., in a format that the rendering circuit is not configured to process), for example, in the case of a DVD player, where the content is in any of: an MPEG 4 format, Real Networks format, MPEG1/MPEG2 format, or if the content is not in the proper frame rates or resolution as required by the DVD player, the computer 40 will decompress the content before forwarding it to the rendering circuit 210. In either case, the emulation circuit 230 will convert the content to a displayable format. Thereafter, video information may be displayed on a video display 250, while audio information may be amplified by audio amp 260 and thereafter displayed by the audio display 262. In one embodiment, the audio display is a speaker.

In accordance with the practices of persons skilled in the art of computer programming, the invention is described herein with reference to symbolic representations of operations that are performed by computer system 100, the processor 212 and/or processor 238, unless indicated otherwise. It will be appreciated that operations that are symbolically represented include the manipulation by CPU 110, processor 212 and/or processor 238, of electrical signals representing data bits and the maintenance of data bits at memory locations in memory 124, memory 218 and/or memory 232 respectively, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" or "machine-readable medium" may include any medium that can store or transfer information. Examples of the processor readable medium include an electronic circuit, a semiconductor memory device, a ROM, a flash memory, an erasable ROM (EROM), a floppy diskette, a CDRW-ROM, a DVDRW-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

One application of the invention is in a home networking system. In one embodiment, a personal computer is coupled to a home networking system that includes at least one audio/visual device. Content (such as media elements described above) may be located on a machine-readable medium that may be read by the computer or the audio/visual device, on a drive (e.g., DVD drive, CD drive, hard disk drive or other like drive) of the computer or the audio/visual device, or on a remote site, accessible through a network. In one embodiment, the user is presented with a graphical user interface (GUI), such as a menu comprising a plurality of items. In one embodiment, the processor 212 in the rendering circuit 212 may request for a menu in response to the user's input or request. The emulation circuit 230 receives the request, and proceeds to determine where the GUI is stored and thereafter, retrieve the GUI. In one embodiment, the GUI is—in part or in entirety—stored in memory 218, memory 232 or in the memory of computer 40 (see FIG. 2). The GUI may be an existing object or may be synthesized by blending two objects. Thus, it may be stored in memory described above, stored in a removable medium and/or synthesized at the computer 40 or A/V device 30. The items on the GUI may be a representation of any of the media elements described above. The user may select a desired item from the menu using selection buttons on a remote control. For example, the user may browse through the menu using the UP and DOWN arrow keys of the remote control, where the item of interest is highlighted. Upon reaching a desired item, the user may use an ENTER key to select the item and direct his/her input by sending commands to the communications port 214. The user may also may his/her selection through selection keys on the front panel 216.

Alternatively, the user may enter a search term for a desired item. This may be accomplished by selecting the item through an alpha numeric pad on the remote control or by using the arrow keys to select and enter alpha numeric codes on the GUI. Upon receipt of the selected item or search term, the processor 212 in the rendering circuit 210 forwards the search item or term to the emulation circuit 230, which initiates a search of the desired item.

In either case, if the desired item is located in the audio/visual device 30 (either in memory or on a machine-readable medium in the device 30), the emulation circuit 230 issues a command to the A/V device subsystem 200 to deliver the corresponding media element to the rendering circuit 210. If the desired item is located on the computer 40 (either in memory or on a machine-readable medium in the computer 40), the emulation circuit 230 instructs the computer to deliver the content to the rendering circuit 210. If the desired item is located on a remote site, such as site 12 or any of the sites $50_1$-$50_{NN}$, the emulation circuit 230 issues a request to transfer the desired item from the site 12 or any of sites $50_1$-$50_{NN}$ to the audio/visual device 30, which will thereafter deliver the corresponding media element to the rendering circuit 210. Priority or contention resolution of content location may be required. For example, if the content is located on more than one location, the emulation circuit 230 or computer 40 may have to determine the most efficient way of retrieving the content. Software may be implemented to provide such resolution.

In one embodiment, control interface or translation software may be stored in memory in the emulation circuit 230 or computer 40. The control interface or translation software enables the rendering circuit 210 or computer 40 to receive and/or process the content for delivery to the home entertainment system or to a display device. Such processing may include transcoding or formatting the information for distribution of the content. In one embodiment, the control interface or translation software enables the computer to provide format conversion, digital rights management conversion and to provide content protection. For example, permission for retrieving the content may be monitored by the computer 40 or A/V device 30. In addition, format conversion such as content conversion, meta data conversion and DRM conversion may be provided. In addition, decryption of the received content may also be facilitated by processor 238. Decryption of the received content may also be facilitated by computer 40. In one embodiment, decryption of content is provided by the target receiving the content. That is, if the computer 40 receives encrypted data, decryption will be performed by the computer 40. Alternatively, if the A/V device 30 receives the encrypted data, processor 238 may decrypt the received content.

In addition, as discussed earlier, in one embodiment, where the content received is compatible with the A/V device 30, the content is forwarded directly to the A/V device 30. However, where the content is not compatible, the computer converts the content to a format that is compatible to that of the A/V device 30. In alternate embodiments, the A/V device 30 may be able to process content that is not compatible.

Upon locating the desired media element, the emulation circuit 230 forwards the media element to the rendering circuit 210. In order to present the media element on a display device, such as a television screen or speakers, formatting of the media element may be required. Once the media element has been formatted for display, the rendering circuit 210 forwards it to the video display 260 and/or audio display 262 for viewing or listening.

In another embodiment, an application program may also be stored in memory 218 to interpret the user issued commands (issued via the remote control or consumer appliance control panel). Such commands may include a request to provide status, to monitor and/or adjust network flow data and/or to provide a graphical user interface (such as a menu) at either the display screen of the computer 100 or the display 250 connected to the A/V device 30. In an alternate embodiment, the aforementioned software may be stored memory in the A/V device 30.

Figure 4A:
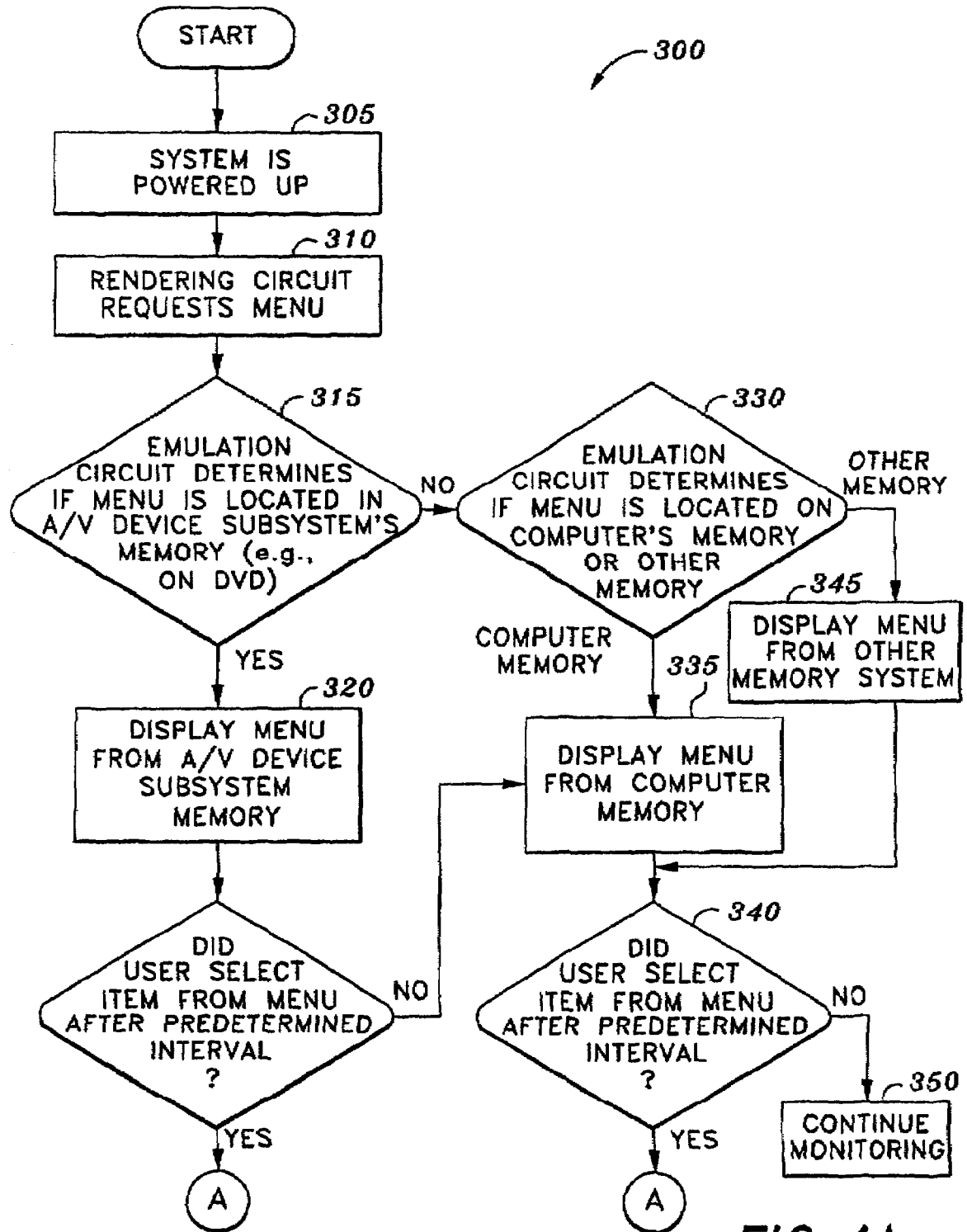
FIGS. 4A and 4B illustrate one embodiment of a process flow of the invention.
Figure 4B:
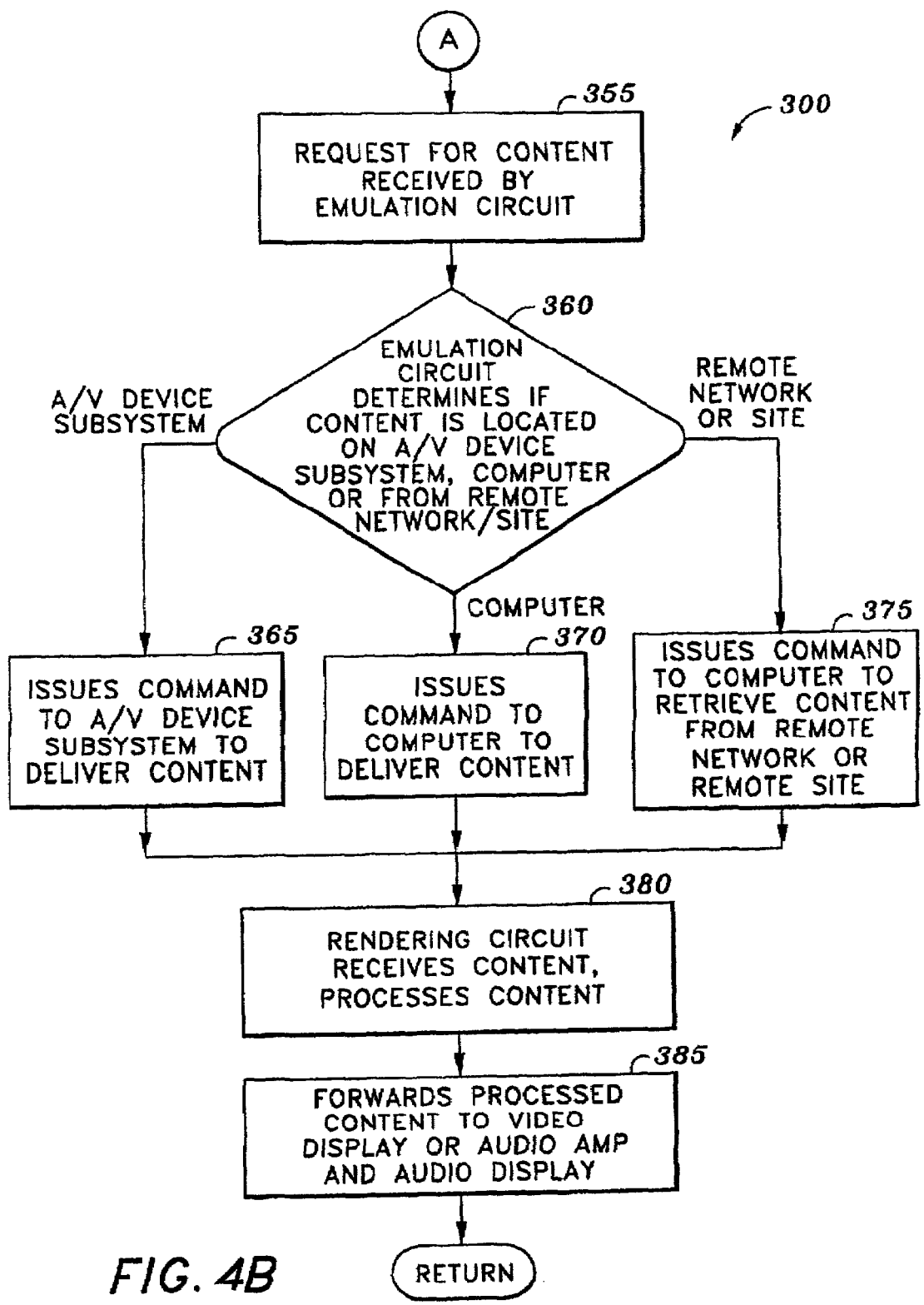

FIGS. 4A and 4B illustrate one embodiment of a process flow of the invention. Proceeding from a START state, the system is first powered up, as shown in process block 305. The process 310 then proceeds to process block 310, where the rendering circuit 210 requests for the system menu. The emulation circuit 230 then determines if the menu is located in the A/V Device subsystem's memory, as shown in decision block 315. If so, the process 300 advances to process block 320, where it displays the menu stored in the A/V Device Subsystem's memory. Next, the process 300 queries if the user selected an item from the menu after a predetermined interval (process block 325). If so, the process 300 proceeds to process node A. If not, the process 300 proceeds to process block 335.

If, at decision block 315, the process 300 determines that the menu was not located in the A/V Device Subsystem's memory, the process 300 proceeds to decision block 330, where the emulation circuit 230 queries if the menu is located on the computer's memory or in another memory. If the menu is located in the computer's memory, the process 300 advances to process block 335, where it displays the menu from the computer memory. The process 300 then proceeds to decision block 340. If, at decision block, 330, the process 300 determines that the menu is located in another memory location, the process proceeds to process block 345, where it displays the menu from the other memory. The process 300 then proceeds to process block 340.

At process block 340, the process queries if the user had selected an item from the displayed menu, after a predetermined interval. If so, the process 300 proceeds to process node A (see FIG. 4B). Otherwise, it proceeds to process block 350, where it continues monitoring, and thereafter returns to decision block 340.

With reference to FIG. 4B, the process 300 proceeds from process node A to process block 355, where a request for content is received by the emulation circuit 230 (see FIG. 4) of the A/V device 30, in response to the user's selection of an item on the menu. The process 300 then advances to decision block 360, where the control and interface logic 360 determines if the requested content is located on the A/V device subsystem 200, the computer 40 or from a remote network site. If the requested content is located on the A/V device subsystem 200, the process 300 issues a command to the A/V subsystem to deliver the content (process block 365), and then proceeds to process block 380. If the content is located on the computer 40, the process 300 issues a command to the computer to deliver the content (process block 370), and it then proceeds to process block 380. If the content is located on the remote network site, the process 300 issues a command to the remote network site to deliver the content (process block 375), and it then proceeds to process block 380.

At process block 380, the rendering circuit 210 receives the content, and processes the content. Examples of such processing includes decryption, decompression and formatting. The rendering circuit 210 then forwards the processed content to the video display 250 (see FIG. 3) or audio display 262 via the audio amp 260 (see FIG. 3). The process then returns to the main system process.

Figure 5:
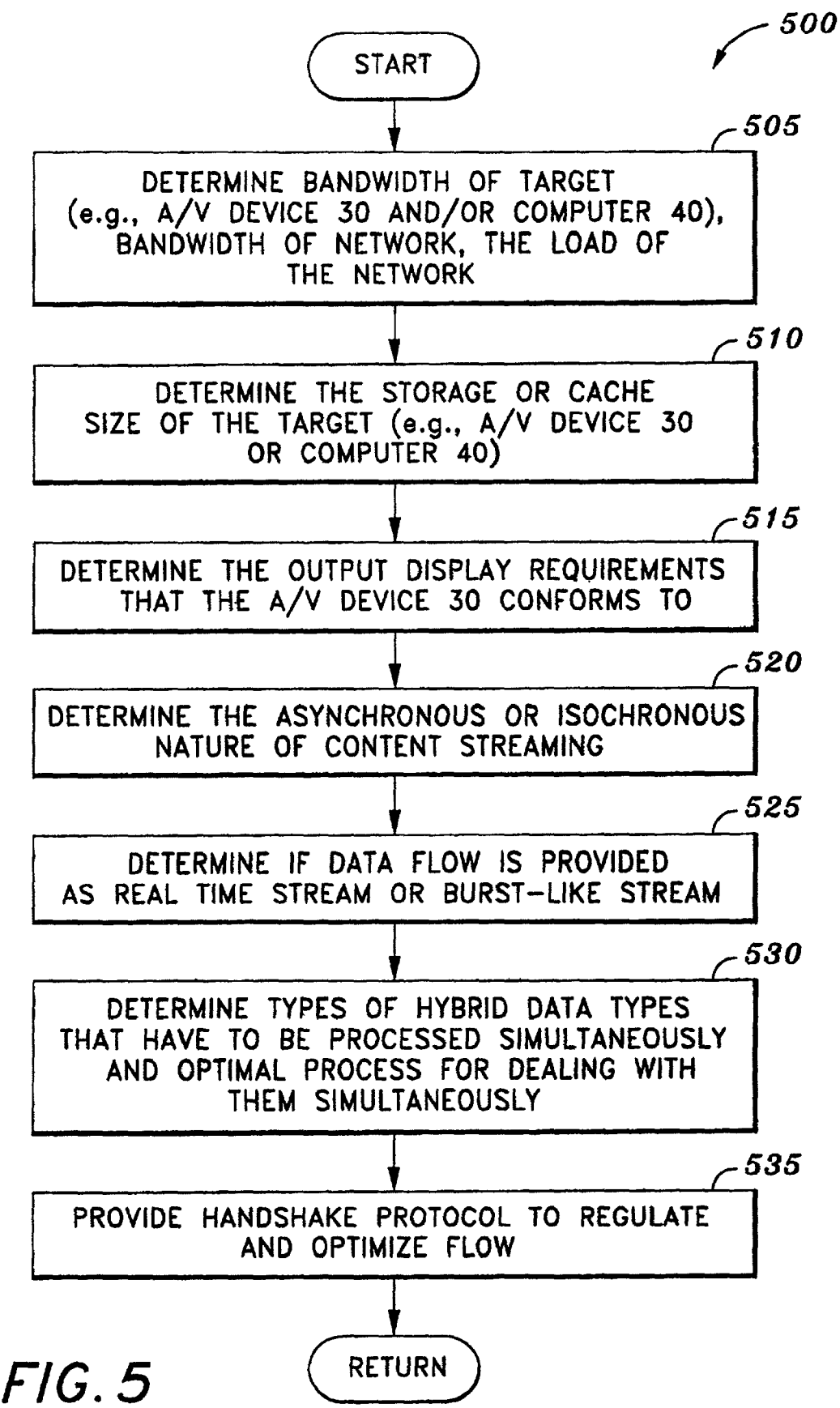
FIG. 5 illustrates one embodiment of flow control optimization.

FIG. 5 illustrates an overview of one embodiment of a flow control optimization process. The process 500 may be implemented to regulate and/or optimize data flow within the system of FIG. 1, as described below. To optimize data flow, various parameters of the network, the target devices, data types, and data characteristics should be determined. Process blocks 505-530 illustrate one embodiment of the parameters that should be considered. The order of determination may proceed in any manner suitable or as decided by the control engineer.

Proceeding from a start state, the process 500 determines the bandwidth of the target, such as the A/V device 30 and/or computer 40, the bandwidth of the network (such as that shown in FIG. 1), and the load of the network (process block 505). Next, the process 500 determines the storage or cache size of the target (e.g., A/V device 30 or computer 40), as shown in process block 510. The output display requirements that the A/V device 30 conforms to are also determined (process block 515). Next, the process 500 determines the asynchronous or isochronous nature of content streaming that will be used (process block 520).

Advancing to process block 525, the process 500 determines if data flow is provided as a real time stream or burst-like stream. It then determines the types of hybrid data types that have to be processed simultaneously (process block 530). Based on this determination, the process 500 identifies the optimal process for dealing with the hybrid data types simultaneously. Upon obtaining the required parameter determinations, the process 500 provides a handshake protocol to regulate and optimize data flow, as shown in process block 535. The process 500 then returns to a main process flow or terminates.

The invention thus provides emulation of the audio/visual device format and controller circuit. For example, where the audio/visual device is a DVD system, an emulation circuit within the DVD system behaves as though it is the DVD drive, and provides content that has been requested by the user. Such an arrangement may be provided without the need for implementing specialized appliances. Through the use of the invention, network connectivity may be provided to a embedded interface (such as the emulation circuit) so as to leverage the system's downstream signal processing and handling circuitry.

Although the present invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An audio/visual system comprising:
   a. an audio/visual device subsystem;
   b. a user interface facilitating operation of the device subsystem and selection of content;
   c. a rendering circuit facilitating presentation of selected content on the audio/visual system in a digital format native to the audio/visual system; and
   d. an emulation circuit facilitating receipt of a content selection via the user interface, determining if the content resides on the device subsystem in the digital native format and, if not, obtaining the content from another source in a format other than the digital native format, converting the content into the digital native format and providing the converted content to rendering circuit for presentation, the emulation circuit thereby facilitating the rendering of the received content by the rendering circuit as if the content was retrieved from the device subsystem in the digital native format.

2. The system of claim 1 wherein the audio/visual system further comprises a drive.

3. The system of claim 1 wherein the another source is a computer.

4. The system of claim 3 wherein the computer is connected to the audio/visual system via a computer network.

5. The system of claim 4 wherein the computer network is selected from a group consisting of: a global computer network, a local area network, and a wide area network.

6. The system of claim 4 further comprising a memory for storing content retrieved from said computer network on said audio/visual system.

7. The system of claim 4 wherein the emulation circuit transcodes information retrieved from said computer network.

8. The system of claim 4 wherein the emulation circuit further includes stored instruction sequences to control data flow through the audio/visual system based on at least one of the following parameters: at least one parameter of said computer network, at least one parameter of a target device in said computer network, an output display requirement of said audio/visual system, a data type of said content and a data characteristic of said content.

9. The system of claim 8 wherein said at least one parameter of said target device is one or more of the following: a bandwidth of said target device, and a storage size of said target device.

10. The system of claim 8 wherein the emulation circuit further includes stored instruction sequences to control data flow through the audio/visual system by providing a handshake protocol based on said at least one parameter of said computer network, to optimize data flow.

11. The system of claim 3 wherein the computer is directly connected to the audio/visual system.

12. The system of claim 1 wherein said audio/visual device subsystem is selected from a group consisting of a digital versatile disk system, a digital video cassette recorder, an audio presentation device and a television.

13. The system of claim 1 wherein the rendering circuit decompresses said content prior to presentation.

14. The system of claim 1 wherein the rendering circuit formats said content prior to presentation.

15. The system of claim 1 wherein the emulation circuit further packetizes said content for distribution to a home network system.

16. The system of claim 1 further comprising a remote control, said remote control to issue a control signal that is converted by said audio/visual system to a network command for retrieving said content.

17. The system of claim 1 wherein said audio/visual system is coupled to a network comprising a plurality of audio/visual apparatuses, and said emulation circuit retrieving said content from one of said plurality of audio/visual apparatuses.

18. A method of facilitating selection and display of media content on a player device comprising a device subsystem for presenting media content in a digital format native to the player device including a user interface adapted to operate the device and facilitating selection of content thereon, the method comprising the steps of:
   a. receiving a content selection via the user interface and determining if the content is accessible via the device subsystem in the digital native format;
   b. if so, reading the content from the device subsystem, rendering the content for presentation in the digital native format on the player device and displaying the content on the player device;
   c. if not, obtaining the content from another source in a format other than the digital native format, converting the content into the digital native format, rendering the content as though read from the device subsystem of the player device in the digital native format, and displaying the content on the player device.

19. The method of claim 18 wherein the content is obtained from another source via a computer network.

20. The method of claim 19 further comprising transmitting the content retrieved from said network to a computer for remote storage.

21. The method of claim 19 wherein the computer network is selected from a group consisting of: a global computer network, a local area network, and a wide area network.

22. The method of claim 19 further comprising storing content retrieved from said computer network in a memory device residing on said player device.

23. The method of claim 19 further comprising transcoding said content retrieved from said computer network.

24. The method of claim 19 further comprising controlling data flow in said player device, based on at least one of the following parameters: at least one parameter of said computer network, at least one parameter of a target device in said computer network, an output display requirement of said player device, a data type of said content and a data characteristic of said content.

25. The method of claim 24 wherein said at least one parameter of said target device is one or more of the following: a bandwidth of said target device, and a storage size of said target device.

26. The method of claim 24, wherein controlling data flow further comprises providing a handshake protocol based on said at least one parameter of said computer network to optimize data flow.

27. The method of claim 18 wherein said player device is selected from a group consisting of a digital versatile disk system, a digital video cassette recorder, an audio presentation device and a television.

28. The method of claim 18 further comprising decompressing said content prior to presentation of said content.

29. The method of claim 18 further comprising formatting said content prior to presentation of said content.

30. The method of claim 18 further comprising packetizing said content for distribution to a home network system.

31. The method of claim 18 further comprising receiving a control signal from a remote control, said control signal being converted by said player device to a network command for retrieving said content.

* * * * *